US008239535B2

(12) United States Patent
Error et al.

(10) Patent No.: US 8,239,535 B2
(45) Date of Patent: Aug. 7, 2012

(54) NETWORK ARCHITECTURE WITH LOAD BALANCING, FAULT TOLERANCE AND DISTRIBUTED QUERYING

(75) Inventors: Christopher Reid Error, Orem, UT (US); Michael Paul Bailey, Provo, UT (US)

(73) Assignee: Adobe Systems Incorporated, San Jose, CA (US)

( * ) Notice: Subject to any disclaimer, the term of this patent is extended or adjusted under 35 U.S.C. 154(b) by 1415 days.

(21) Appl. No.: 11/313,589

(22) Filed: Dec. 20, 2005

(65) Prior Publication Data

US 2006/0274761 A1    Dec. 7, 2006

Related U.S. Application Data

(60) Provisional application No. 60/688,104, filed on Jun. 6, 2005.

(51) Int. Cl.
*G06F 15/173* (2006.01)
(52) U.S. Cl. ........ 709/226; 709/224; 707/769; 707/770; 707/774; 707/775; 707/776; 707/781; 707/782
(58) Field of Classification Search .................. 709/224, 709/226
See application file for complete search history.

(56) References Cited

U.S. PATENT DOCUMENTS

| | | | | |
|---|---|---|---|---|
| 6,160,819 | A * | 12/2000 | Partridge et al. | 370/474 |
| 6,285,997 | B1 | 9/2001 | Carey et al. | |
| 6,470,333 | B1 * | 10/2002 | Baclawski | 1/1 |
| 6,823,391 | B1 * | 11/2004 | Deen et al. | 709/229 |
| 6,865,605 | B1 * | 3/2005 | Soderberg et al. | 709/226 |
| 6,898,633 | B1 * | 5/2005 | Lyndersay et al. | 709/226 |
| 6,983,338 | B2 * | 1/2006 | Hadba et al. | 710/74 |
| 7,149,222 | B2 * | 12/2006 | Wiryaman et al. | 370/401 |
| 7,161,487 | B1 * | 1/2007 | Tracey et al. | 340/572.1 |
| 7,209,148 | B2 * | 4/2007 | Rasmussen et al. | 345/613 |
| 7,337,351 | B2 * | 2/2008 | Zane et al. | 714/6.12 |
| 7,349,960 | B1 * | 3/2008 | Pothier et al. | 709/224 |
| 7,350,229 | B1 * | 3/2008 | Lander | 726/8 |
| 7,370,064 | B2 * | 5/2008 | Yousefi'zadeh | 1/1 |
| 7,376,665 | B2 * | 5/2008 | Marr et al. | 1/1 |
| 7,486,678 | B1 * | 2/2009 | Devanagondi et al. | 370/394 |
| 7,525,963 | B2 * | 4/2009 | Su et al. | 370/390 |
| 7,925,665 | B2 * | 4/2011 | Schneider et al. | 707/774 |
| 2001/0049671 | A1 * | 12/2001 | Joerg | 706/50 |
| 2002/0059170 | A1 * | 5/2002 | Vange | 707/1 |
| 2002/0133400 | A1 * | 9/2002 | Terry et al. | 705/14 |

(Continued)

*Primary Examiner* — Backhean Tiv
(74) *Attorney, Agent, or Firm* — Robert C. Kowert; Meyertons, Hood, Kivlin, Kowert & Goetzel, P.C.

(57) ABSTRACT

A network architecture with load balancing, fault tolerance and distributed querying comprises a plurality of front-end servers, a plurality of back-end servers, and a database. The front-end servers are coupled to a network to receive data requests from client devices. The front-end servers are each coupled to the plurality of back-end servers. The front-end servers handle data requests at a macro level and divide the request into sub-requests that are sent to the plurality of back-end servers. The back-end servers are coupled to the database to retrieve data. Each data request is distributed across the plurality of back-end servers according to workload. The front-end servers are fault tolerant in that they can respond to a request for data without all of the back-end servers being responsive or providing data. The present invention also includes a plurality of methods including: a method for distributed querying, a method for loading data sets from a database, and a method for responding to a query that provides fault tolerance.

26 Claims, 7 Drawing Sheets

U.S. PATENT DOCUMENTS

| | | | |
|---|---|---|---|
| 2002/0194051 A1* | 12/2002 | Hall et al. | 705/10 |
| 2003/0028640 A1* | 2/2003 | Malik | 709/226 |
| 2003/0046339 A1* | 3/2003 | Ip | 709/203 |
| 2003/0120660 A1* | 6/2003 | Maritzen et al. | 707/100 |
| 2003/0154442 A1* | 8/2003 | Papierniak | 715/501.1 |
| 2004/0030739 A1* | 2/2004 | Yousefi'zadeh | 709/201 |
| 2004/0059746 A1* | 3/2004 | Error et al. | 707/102 |
| 2004/0093425 A1* | 5/2004 | Thomas | 709/236 |
| 2004/0135805 A1* | 7/2004 | Gottsacker et al. | 345/751 |
| 2004/0162822 A1* | 8/2004 | Papanyan et al. | 707/4 |
| 2004/0174397 A1* | 9/2004 | Cereghini et al. | 345/855 |
| 2004/0193656 A1* | 9/2004 | Pizzo et al. | 707/201 |
| 2005/0080858 A1* | 4/2005 | Pessach | 709/206 |
| 2005/0080913 A1* | 4/2005 | Thomas | 709/230 |
| 2005/0114480 A1* | 5/2005 | Ramamoorthy | 709/220 |
| 2005/0125807 A1* | 6/2005 | Brady et al. | 719/318 |
| 2005/0182838 A1* | 8/2005 | Sheets et al. | 709/226 |
| 2005/0228855 A1* | 10/2005 | Kawato | 709/200 |
| 2005/0270299 A1* | 12/2005 | Rasmussen et al. | 345/552 |
| 2006/0020691 A1* | 1/2006 | Patterson et al. | 709/223 |
| 2006/0080388 A1* | 4/2006 | Cherkasova et al. | 709/203 |
| 2006/0101142 A1* | 5/2006 | Vasseur et al. | 709/225 |
| 2006/0155805 A1* | 7/2006 | Kim | 709/203 |
| 2006/0161554 A1* | 7/2006 | Lucovsky et al. | 707/10 |
| 2006/0224744 A1* | 10/2006 | Rao et al. | 709/227 |
| 2006/0271935 A1* | 11/2006 | Cox et al. | 718/102 |
| 2006/0274761 A1* | 12/2006 | Error et al. | 370/396 |
| 2006/0274763 A1* | 12/2006 | Error | 370/400 |
| 2007/0182751 A1* | 8/2007 | Rasmussen et al. | 345/562 |
| 2007/0226320 A1* | 9/2007 | Hager et al. | 709/219 |
| 2008/0022136 A1* | 1/2008 | Mattsson et al. | 713/194 |
| 2008/0133623 A1* | 6/2008 | Tsuchida et al. | 707/204 |
| 2008/0170579 A1* | 7/2008 | Chafle et al. | 370/401 |
| 2008/0201357 A1* | 8/2008 | Error et al. | 707/102 |
| 2008/0222195 A1* | 9/2008 | Marr et al. | 707/102 |
| 2009/0037579 A1* | 2/2009 | Error et al. | 709/224 |
| 2009/0083130 A1* | 3/2009 | Hall et al. | 705/10 |

* cited by examiner

FIG. 7

NETWORK ARCHITECTURE WITH LOAD BALANCING, FAULT TOLERANCE AND DISTRIBUTED QUERYING

CROSS-REFERENCES TO RELATED APPLICATIONS

The present application claims priority under 35 U.S.C. §119(e) to U.S. Provisional Patent Application No. 60/688,104, filed on Jun. 6, 2005, entitled "NETWORK ARCHITECTURE WITH LOAD BALANCING, FAULT TOLERANCE AND DISTRIBUTED QUERYING" which is incorporated by reference in its entirety.

BACKGROUND OF THE INVENTION

1. Field of the Invention

This invention relates generally to system for responding to data queries. For example for web analytics data. More particularly, the present invention relates a system and method that reduce the time for response to multiple queries by load balancing over computing devices while also providing fault tolerance.

2. Background of the Invention

Web analytics basically refers to the analysis of data created by website usage. For instance, web analytics could be used to mine visitor traffic data. A variety of visitor traffic data is measured such as what web browser is being used, what links on a given web page were selected, whether a product was purchase, etc. There are number of web analytics tools presently available such as Site Catalyst version 11 from Omniture of Orem, Utah.

One problem with such existing tools and systems is there ability to respond to requests for information from thousands of users requesting thousands of different data groups. There is also a need for a system that provides fault tolerance in case where a failure occurs for a portion the network or system. Finally, there is need to optimize the usage of different groups of machines by load balancing while not reducing processing speed by adding administrative over head to accomplish load balancing.

SUMMARY OF THE INVENTION

The present invention is a network architecture with load balancing, fault tolerance and distributed querying. The system of the present invention preferably comprises a plurality of front-end servers, a plurality of back-end servers, and a database. The front-end servers are coupled to a network to receive data requests from client devices. The front-end servers are each coupled to the plurality of back-end servers. The front-end servers handle data requests at a macro level and divide the request into sub-requests that are sent to the plurality of back-end servers. The back-end servers are coupled to the database to retrieve data. Each data request is distributed across the plurality of back-end servers according to workload. The front-end servers are fault tolerant in that they can respond to a request for data without all of the back-end servers being responsive or providing data. The present invention also includes a plurality of methods including: a method for distributed querying, a method for loading data sets from a database, and a method for responding to a query that provides fault tolerance.

DETAILED DESCRIPTION OF THE PREFERRED EMBODIMENTS

The present invention is a network architecture with load balancing, fault tolerance and distributed querying. While the present invention and its principles will now be described in the context of a network 102 used as part of a web analytics system, this is only by way of example. Those skilled in the art will recognize that the present invention may be used in any variety of general purpose databases to provide the same advantages as noted below.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Architecture

Figure 1:
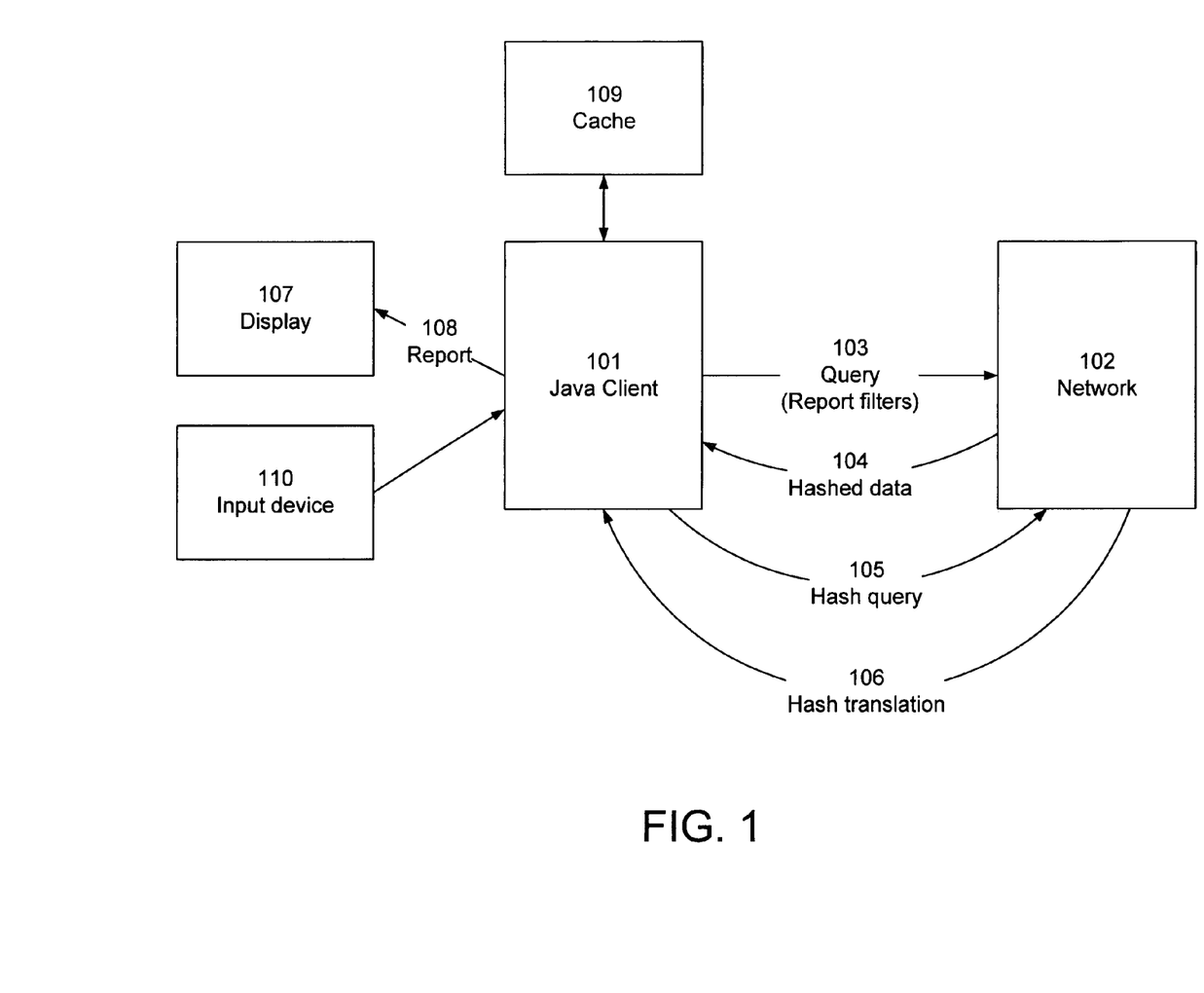
FIG. 1 is a block diagram of a system for operating, web analytics tools of the present invention.

Referring now to FIG. 1, there is shown an example of an architecture for practicing the present invention according to one embodiment. One skilled in the art will recognize that the invention can be practiced using other embodiments that differ from the examples shown.

Java client 101 runs on a personal computer for viewing and interacting with website usage reports. Client 101 sends reports to display 107 (or other output device) for output to the user. Network 102 is a centralized network for handling and responding to client requests for data on website usage.

In one embodiment, the user interface is implemented using a known environment such as Macromedia Flex, Java, DHTML, or any combination thereof.

In one embodiment, the components shown in FIG. 1 operate as follows. When a report is to be displayed, Java client 101 sends query 103 to network 102, specifying which reports are requested, and optionally specifying one or more filters for the reports. In one embodiment, query 103 is in XML format.

In response to query 103, network 102 returns hashed data 104 that contains an encoded representation of the report data. For example, the hashed data 104 may specify, in hash coded terms, the number of visitors that were using a specific web browser and that visited the website within a specified time period. This hashed data 104 is received by client 101.

Client 101 stores, in local cache 109, a list of previously received and decoded hash codes, so that it can correctly interpret a hash code that it has encountered previously. In one embodiment, local cache 109 is cleared at the end of a session, so that only those codes previously received in the same session are stored in cache 109. In other embodiments, local cache 109 is implemented in a more persistent or less persistent fashion, depending on user needs.

Upon receiving hashed data 104, client 101 consults cache 109; if cache 109 contains the hash code(s) in data 104 (in other words, if client 101 has previously received data containing the same hash code), client 101 can interpret the meaning of the hash-coded data without any further communication with network 102. If hash code(s) from data 104 is/are not present in cache 109, client 101 sends hash query 105 to network 102; network 102 responds by sending hash translation 106 to client 101. Hash translation 106 provides client 101 with the meaning of hash terms (for example, specifying that hash term #299 signifies a user using Internet Explorer 6.0). In one embodiment, client 101 stores this meaning in cache 109 for future use. By way of example, the present invention can employ a method for using hash values as disclosed in related U.S. patent application Ser. No. 11/313,443, filed on Dec. 20, 2005, entitled METHOD FOR COMMUNICATION BETWEEN COMPUTING DEVICES USING CODED VALUES.

Once client 101 has received sufficient data to generate a report, it sends report 108 to display 107 for output to the user. In one embodiment, if some hash meanings have not yet been received, client 101 still sends report 108, and report 108 states that certain hash terms are unknown. In another embodiment, client 101 displays an error message and/or waits until more complete hash meaning data is available.

The user can interact with the displayed report 108 via user input device 110 such as a mouse, a keyboard, or the like. The user can click on areas within report 108; when the user clicks on an area that can be interpreted as a filter, client 101 generates and sends a new query 103 containing the new report filter criteria. The above process then repeats, and an updated report 108 is sent to display 107.

Figure 2:
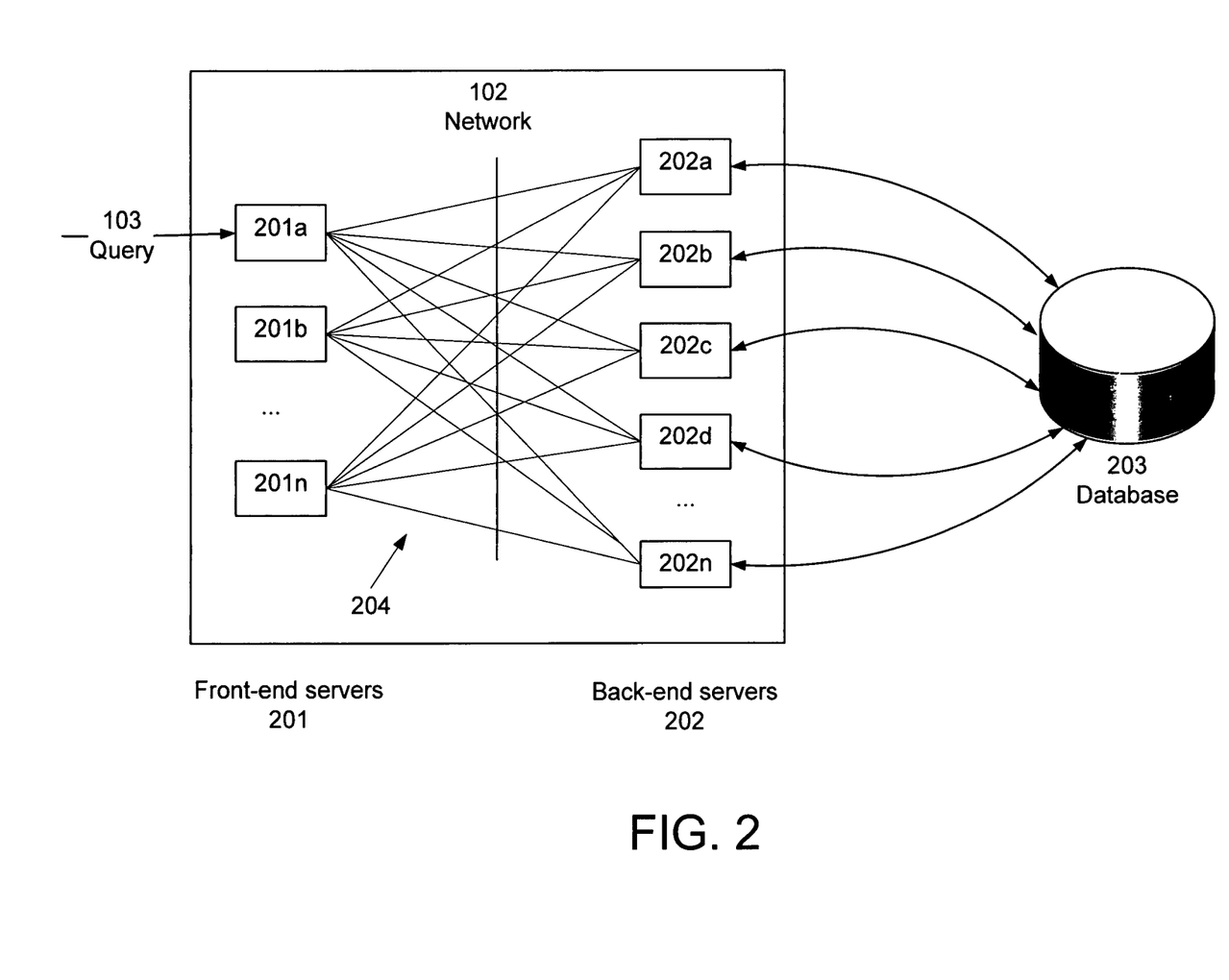
FIG. 2 is block diagram of a preferred embodiment of a network according to the present invention.

Referring now to FIG. 2, there is shown an example of an architecture for network 102 according to one embodiment. Network 102 includes any number of front-end web servers 201a-n that receive queries 103, 105 from client 101, and any number of back-end servers 202a-n that obtain data from storage, analyze the obtained data, and send report data back to client 101. Back-end servers 202a-n send an appropriate data set to client 101 based on the filter request. For example, if a filter request specifies that the user is only interested in visitors that used a particular web browser, back-end servers 202a-n remove the data that does not match the specified criterion, and only forward to client 101 the data that does match. Conceptually, back-end servers 202a-n are applying a movable filter bar to the data set, maintaining consistency in the views into the data while changing the size of the data set according to the filter request.

Database 203 contains website visitation data, which in one embodiment is stored in a binary format stored in some storage medium such as a hard drive. In one embodiment, the website visitation data is broken up into files, or "bricks", to facilitate extraction of portions of the data. When servers 202a-n extract data from database 203, they are provided with specific bricks that match the criteria.

In one embodiment, when the user requests a report showing website visitation data for a specified time period, back-end servers 202a-n extract data from database 203 that contains web visitation logs and/or statistics. In one embodiment, servers 202a-n obtain data from database 203 that represents a snapshot of website visitation over a specified time period. Servers 202a-n then store this website visitation data in temporary local storage (such as random access memory), using for example a binary format that is encoded according to a hash algorithm so as to minimize bandwidth usage. In one embodiment, this binary format is identical to the format used in database 203, so that no file format translation need be performed when servers 202a-n extract data from database 203. Servers 202a-n and then apply filters as requested, and send the filtered data to client 101.

In one embodiment, whenever the user requests a broader date range for website visitation data, the back-end servers 202a-n perform a new data extraction from database 203. However, when the user narrows the date range from a previously specified range, no new data extraction is performed; rather back-end servers 202a-n filter the previously extracted data according to the new filter parameters. Those skilled in the art will recognize that the step of data extraction may be performed using any combination of data ranges for the data in the database 203 and is not restricted to splitting the data by date range. In alternate embodiments, any other values could be used to partition the data.

As shown in FIG. 2, the front-end servers 201a-n are coupled 204 for communication with the back-end servers 202a-n. Each front-end server 201a-n can be connected 204 to the other back-end servers 202a-n as shown, or a variety of other network topologies may be used so long as messages can be broadcast among the front-end servers 201a-n and the back-end servers 202a-n.

Data Set

Figure 3:
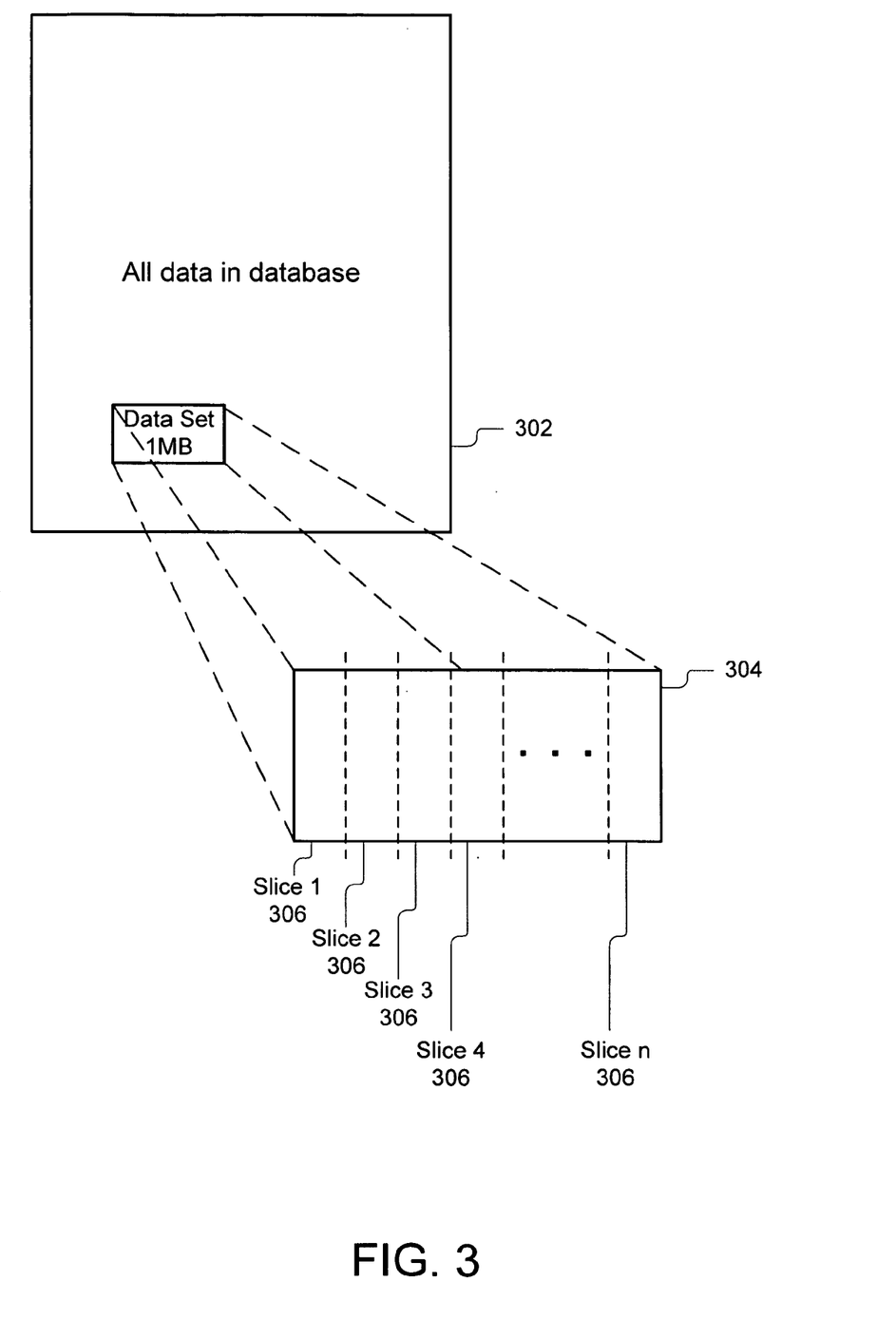
FIG. 3 is graphical representation of data in a database including a data set and slices of the data set.

Referring now to FIG. 3, the storage and retrieval of data by the network 102 can best be understood. FIG. 3 illustrates how and where the data is stored and processed in order to respond to requests or queries from the client 101. All the website visitation data 302 is stored in the database 203. The website visitation data 302 can be for multiple clients 101 and includes all the data about web statistics for those sites. A data set 304 is extracted from all the data 302 in the database 203 for use by the client 101. The data set 304 is preferably smaller in size than all the data 302 so that it can be effectively transmitted and manipulated. In an exemplary embodiment, the data set 1 MB in size. The data set 304 is advantageously created on a per client visit or client session basis. The data set 304 is further divided for processing by individual backend servers 202a-n into data slices 306. The data slices 306 are preferably each a complete uncompromised segment of the data set 304 that can be used to provide a statistically valid response to a query. The division of slices 306 across backend servers 202*a-n* is described in more detail below with reference to FIGS. 5 and 7, but is particularly advantageous because it provides improved speed in responding to queries since each slice can be processed in parallel. Moreover, the distribution of slices over the backend servers 202*a-n* provides a level of fault tolerance because if one more the back-end servers 202*a-n* do not provide their a response for their slice, the system, in particular the front-end servers 201*a-n* are able to generated a response from those back-end servers 202*a-n* that do respond and scale it so that it is representative of the entire data set as will be discussed below with reference to FIG. 6.

General Query Method

Figure 4:
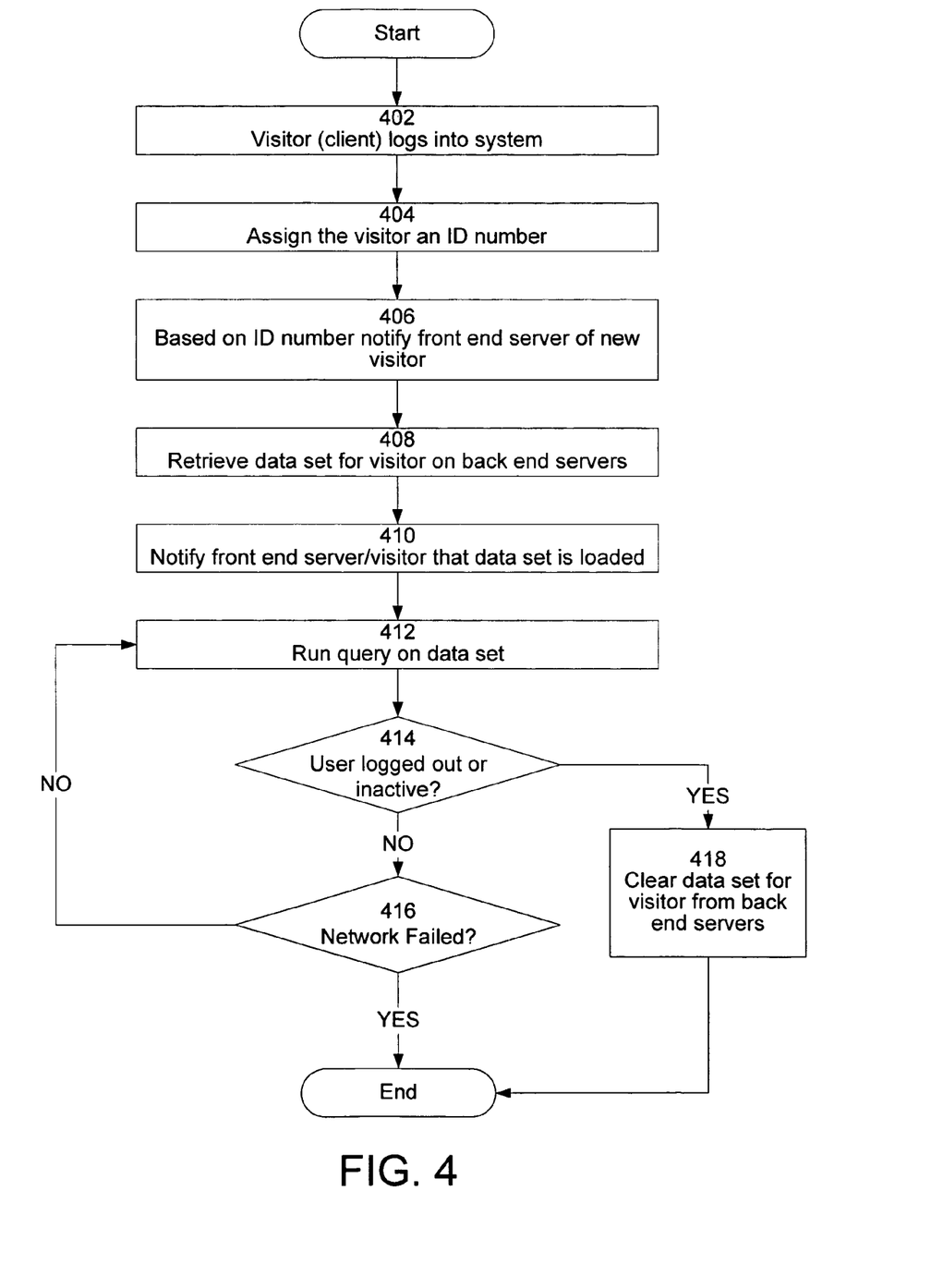
FIG. 4 is a flowchart of one embodiment of a method for accessing a web analytics system and running queries according to the present invention.

Referring now to FIG. 4, a preferred method for operation of the present invention will be described. The process begins when a visitor or client 101 logs 402 onto the system. Upon log in, each visitor is assigned 404 a visitor identification number. This visitor identification number is used to assign the visitor/client 101 to a particular one of the plurality of front-end servers 210*a-n*. It does not matter which front-end server 210*a-n* is assigned to the visitor/client 101; and the front-end servers 210*a-n* are preferably assigned to accomplish load balancing of requests across the plurality of front-end servers 210*a-n*. For example, in one embodiment, the visitors with identification number 1-100 are assigned to front-end server 201*a*, visitors with identification number 200-300 are assigned to front-end server 201*b*, visitors with identification number 300-400 are assigned to front-end server 201*c*, etc. Those skilled in the art will recognize that there is a variety of other ways to distribute visitors over the front-end servers 201*a-n* such as every nth visitor being assigned to front-end server 201*a*, every n+1 visitor assigned to front-end server 201*b*, etc. This is assignment is particularly advantageous because is provides load balancing across the front-end servers 210*a-n*, and also fault recovery in the event a front-end server 210*a-n* fails, its visitors end their connection, but upon re-login will be assigned to one of the remaining operational front-end servers 210*a-n*. Those skilled in the art will also understand that the step of logging in is optional and that in an alternate embodiment, a user need not log in, but rather clients 101 can just send data requests to one of the front-end servers 210*a-n*; and the front-end server 210*a-n* that receives the request can respond to it.

In step 406, based on the ID number the visitor, the corresponding front-end servers 210*a-n* is notified and communication is established between that front-end server 210*a-n* and the visitor. Then the assigned front-end server 210*a-n* divides the request into slices and sends them to the back-end servers 202*a-n* to retrieve 408 the data set 304 and load it to the back-end servers 202*a-n*, as will be described in more detail below with reference to FIG. 5. One advantage of the present invention is that the data set is divided into slices and the slices are assigned to one or more back-end servers 202*a-n* based on the availability of the back-end servers 202*a-n*. Once the data set 304 has been loaded to the back-end servers 202*a-n*, they notify 410 the front-end server 201. The visitor can now run 412 queries on the data set 304, as will be described in more detail below with reference to FIG. 6. Once a query has been run, the front-end server 201 communicating with the visitor determines 414 if the visitor has logged out or there are has been a predetermined amount of time of inactivity by the visitor. If not, the system continues to determine 416 if the network 102 has failed (either all the front-end servers 201*a-n* or not operational or all the back-end servers 202*a-n* are not operational) if so the process ends. If not the process returns to step 412 to continue to process additional requests from the visitor. If the front-end server 201 determined the visitor has logged out or there are has been a predetermined amount of time of inactivity by the visitor in step 414, the front-end server 210 will clear 418 the data set 304 for the visitor from the back-end servers 202*a-n*. This is particularly advantageous because it optimizes the use of the front-end servers 201*a-n* and ensures that only in-use data is loaded on the back-end servers 202*a-n*.

Load Balancing

Figure 5:
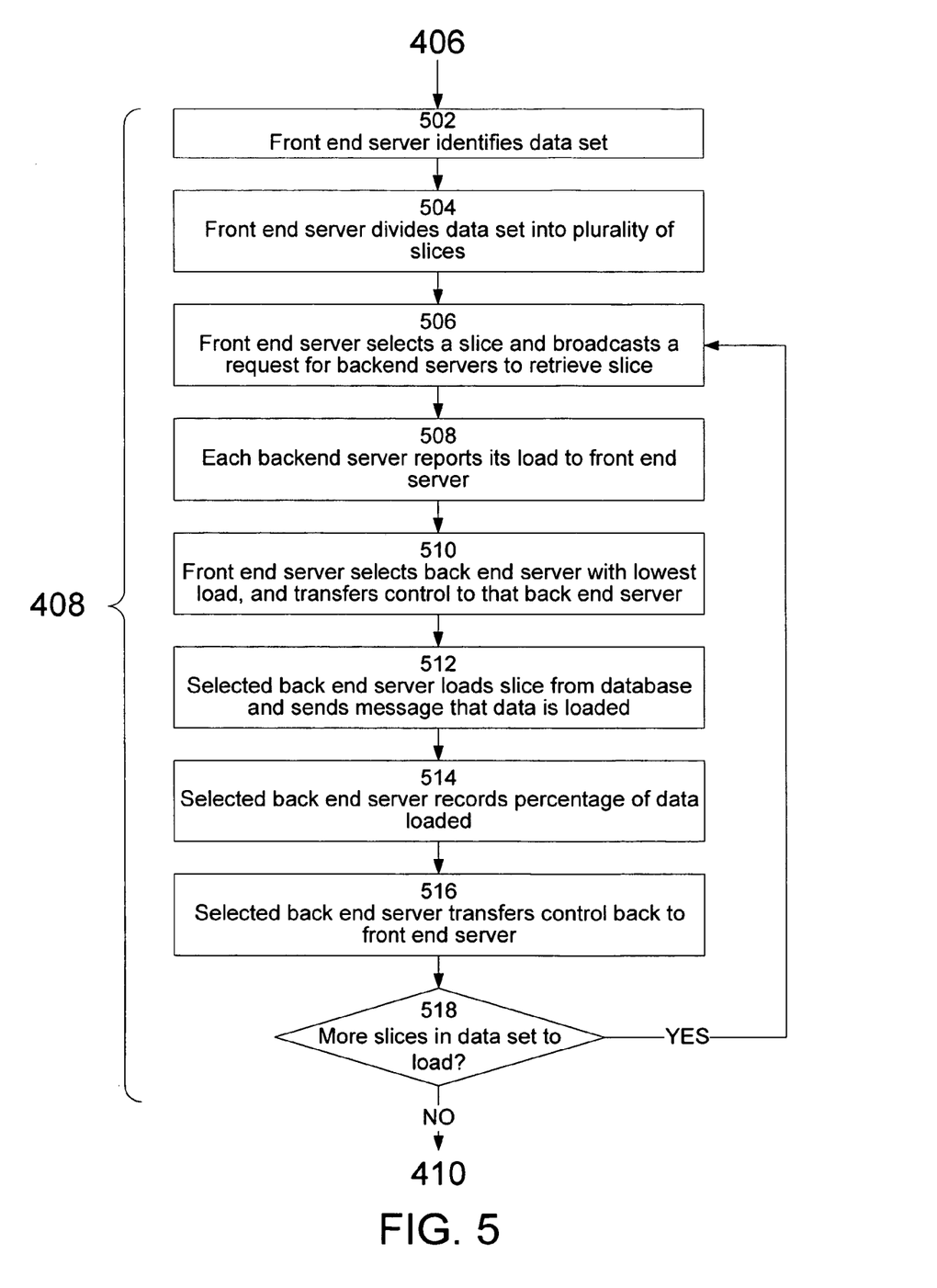
FIG. 5 is a flowchart of one embodiment of a method for loading a data set according to the present invention.

Referring now to FIG. 5, the process for loading 408 the data set 304 to the back-end servers 202*a-n* is shown. The process begins in step 502 with the front-end server 201 identifying the data set 304 corresponding to the visitor. It should be noted that the data is not associated with the visitor, but rather data that is need by a visitor remains loaded on the back-end servers 202*a-n* such that if another visitor needs the data it remains loaded until a predetermined time of non-use has elapsed after which the backend servers 202*a-n* are not required to keep the data loaded. Then the front-end sever 201 divides 504 the data set into a plurality of slices 306. As has been noted above, each of the slices 306 is a complete uncompromised segment of the data set 304 that can be used to provide a statistically valid response to a query. Then the front-end sever 201 selects 506 a slice 306 and broadcasts a request for one of the back-end severs 202 to retrieve the slice 306. This request is preferably broadcast to all available back-end servers 202 such as with a UDP broadcast message. Each back-end server 202*a-n* reports 508 its load and availability to the front-end server 201. The load and availability of a particular back-end server 202*a-n* can be based on a variety of factor including: the number of slices already being processed, the processing power/speed of the back-end server 202, the communication/connection speed available to the back-end server 202, and other processing characteristics as will understood to those of ordinary skill in the art. Next, the front-end sever 201 selects 510 the back-end server 202*a-n* with the lowest load and best availability and transfers control to the selected back-end server 202. This selection is solely to achieve load balancing across the back-end servers 202*a-n*. The selected back-end server 202 then loads 512 the identified slice 306 from the database 203, and sends a confirmation message back to the front-end server 201 indicating the data slice 306 has been loaded. The selected back-end server 202 records 512 the percentage of the data set 304 that the slice 306 represents. Then the selected back-end server 202 transfers 516 control back to the front-end server 201. Then the front-end server 201 determines 518 whether there are any more slices 306 of the data set 304 to be loaded to back-end server 202*a-n*. If so the process returns to step 506 to repeat the process for the next data slice 306.

It should be recognized that a key advantage of the present invention is that the process for loading data slices 306 to the back-end servers 202*a-n* is masterless and done in an anarchistic way. In other words, maintenance of the data is masterless. During loading of the data, one of the front-end servers 201*a-n* temporarily acts as an overseer to divide the data set into slices and send a request to load the slice to which every back-end servers 202*a-n* will accept the request. However, once the data set has been divided into slices and a back-end server 202*a-n* has agreed to load the slice, the front-end server 201*a-n* acting as the overseer, does nothing further to confirm the data is loaded or make sure the back-end server 202*a-n* load or maintain the data. The process of performing step 506-516 for given slices may be done in whole or part in parallel by broadcasting such requests between the front-end server 201 and the back-end servers 202*a-n* before the remaining steps 512-516 complete. In other words, the front-end server 201 does not care which back-end server 202*a-n* responds to the request to retrieve the slice 306 of the data set 304, nor does it track which of the back-end servers 202a-n responded and holds the data slice 306.

Figure 7:
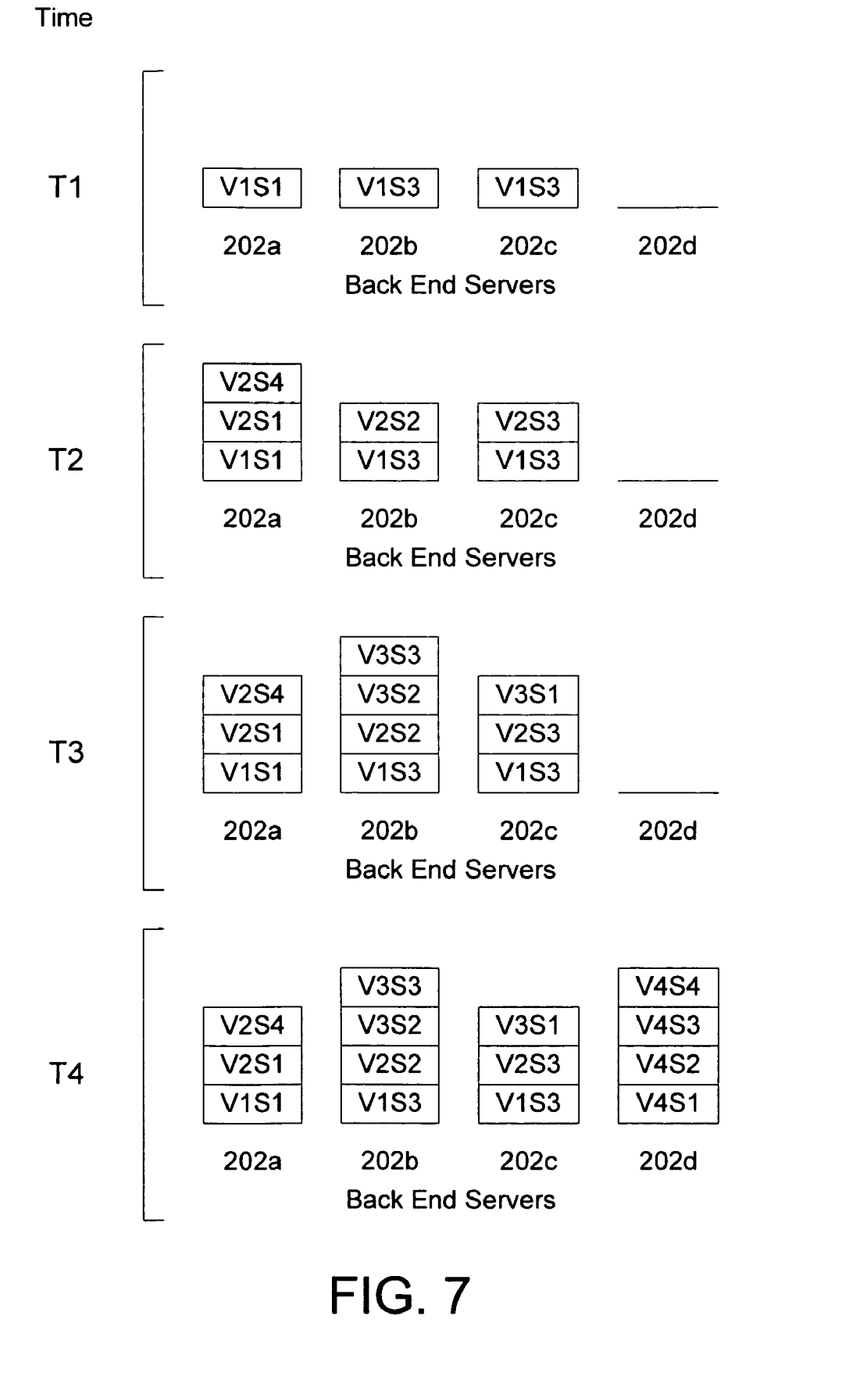
FIG. 7 is graphical representation of load balancing across multiple back-end servers at different points in time for multiple visitors each having a data set including multiple slices.

Referring now also to FIG. 7, an example of the load and how it is balanced over four back-end servers 202a-202d at four different times T1-T4 is shown. At time T0 (not shown) there are no visitors and no slices are loaded on any of the back-end servers 202a-d. Between time T0 and T1, a visitor, V1 logs onto the system and its data set is loaded. A time T1, there are only three servers active, servers 202a-c. The data set 304 for the first visitor (V1) has three slices (S1-S3). As the requests are sent to the back-end servers 202a-c, different servers respond with their availability and the slices are assigned to the sever with the best availability; for example a first slice (V1S1) is loaded on back-end server 202a, a second slice (V1S2) is loaded on back-end server 202b, and a third slice (V1S3) is loaded on back-end server 202c. Between time T1 and time T2, a second visitor V2 with a data set 304 having four data slices V1-V4 is loaded onto the back-end servers 203a-c. As the requests are sent to the back-end servers 202a-c, different servers respond; and a first and four slices (V2S1, V2VS4) are loaded on back-end server 202a, a second slice (V2S2) is loaded on back-end server 202b, and a third slice (V2S3) is loaded on back-end server 202c. Between time T2 and time T3, a third visitor V3 with a data set 304 having three data slices V1-V3 is loaded onto the back-end servers 203a-c. As the requests are sent to the back-end servers 202a-c, different servers respond; and a first slice (V3S1) is loaded on back-end server 202c, a second and third slice (V3S2, V3S3) are loaded on back-end server 202b, and no slices for the third visitor V3 are loaded on back-end server 202a. From the above transitions, it can be seen how the system automatically balances the load over the three back-end servers 202a-c based on their availability. Another key feature of the present invention in the ability to add additional back end servers 202a-d. Between time T3 and T4, an additional server 202d is added to the back-end, and a new visitor V4 with a data set 304 having four slices S1-S4 logs onto the system. Because the additional server 202d is new and has a high availability, all four of the slices for visitor V4S1-V4S4 are loaded on the new back end server 202d as shown at time T4 in FIG. 7. Thus, those skilled in the art will understand how back-end servers 202 can easily be added when additional capacity is needed. Similarly, when a server 202 fails or need to be removed, it can respond to the front-end server 201 with no availability until there are no slices loaded on it then it may be removed. This increased the fault recovery of the system.

Distributed Query

Figure 6:
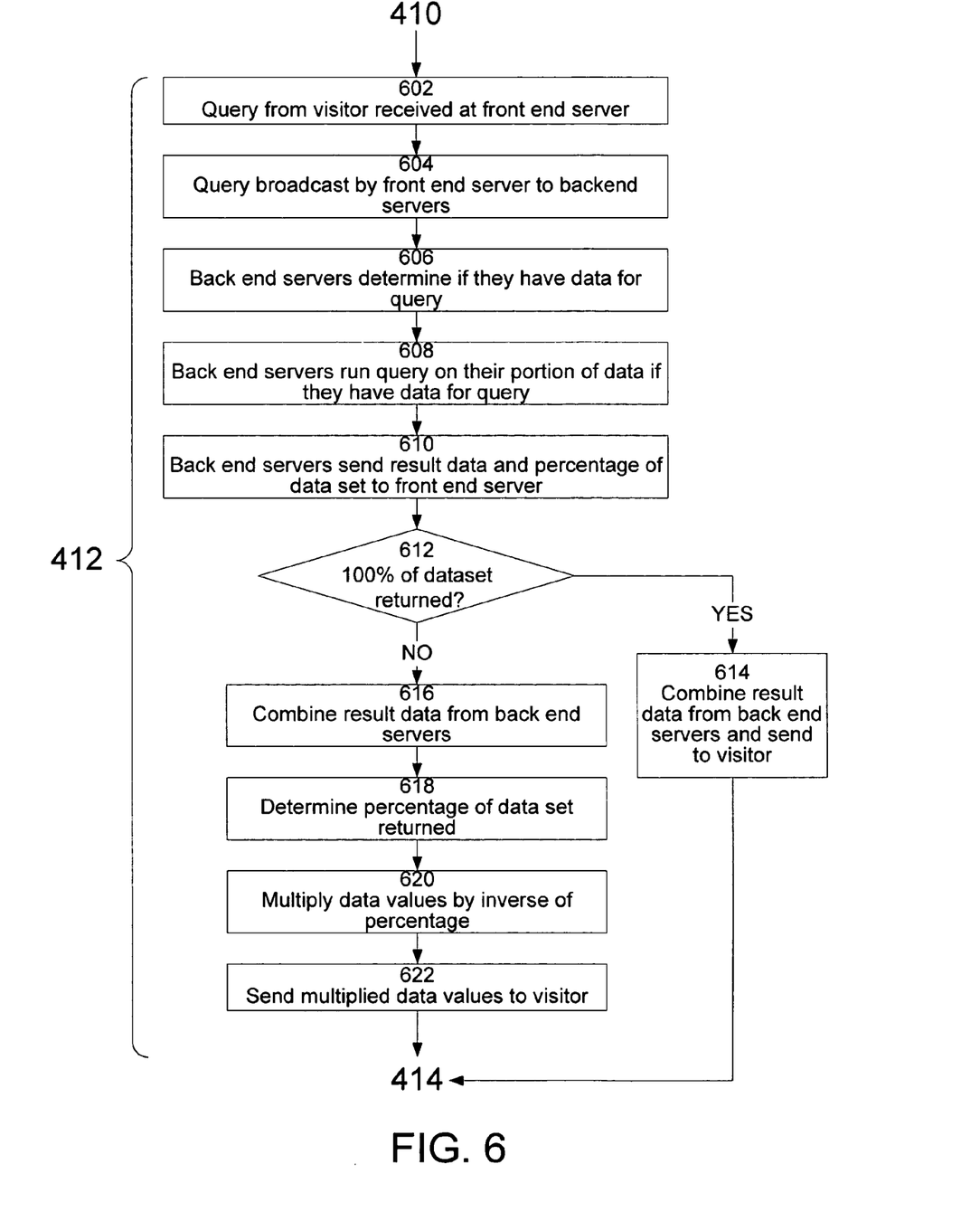
FIG. 6 is a flowchart of one embodiment of a method for responding to a query or request for data according to the present invention.

Referring now to FIG. 6, one embodiment of the method for processing a query is shown. Before the process begins, the data set has already been loaded on the back-end servers 202a-n as discussed above with reference to FIGS. 5 and 7. As shown in FIG. 6, the process begins with a query from a visitor received 602 at the front-end server 201. Then the front-end server 201 assigned to communicate with the visitor according the visitor's number generates and sends 604 a broadcast query to all or a plurality of back end servers 202. Since the front-end server 201 does not know which of the back-end servers 202 store the data set 304 for this visitor, the query needs to broadcast to a plurality, but preferably as many as possible of the back-end servers 202. Then each of the back-end servers 202 receives the query or request, and determines 606 if they have the data for the query. Then in step 608, the back-end servers 202 that have the data for the query, perform the query on their portion of the data set 304. Each of the back-end servers 202 that have data send the result data and what percentage of the entire data set 304 they have back to the front-end server 201. Next, the front-end server 201 determines if 100% of the data set has been returned by whatever responses it received from the back-end severs 202. If so, the method proceeds to step 614 where it combines the result data received from each of the back-end servers 202 and sends it to the visitor, and the response to the query is complete.

If in step 612, it is determined that less than 100% of the data set 304 has been returned, the method continues to step 616 where the front-end server 201 combines the result data from the back-end servers 202. Then the percentage of data from the data set 304 is determined 618. This can be done by summing the percentages received from each back-end server 202 for this visitor for this request from step 610. Then the front-end server 201 multiplies 620 the data from the query by the inverse of the percentage determined in step 618. Then the multiplied values are sent 622 to the visitor as the result data for the query or request. This is particularly advantageous because if for any reason some of the back-end servers 202 are unable to respond to the query or request, the front-end server 201 is still able to create a response from the back-end servers 202 that do respond. This provides a significant advantage of fault tolerance in the event one of the back-end servers 202 fails or does not respond to the data request in a timely manner. Those skilled in the art will recognize that there may be a variety of additional rules applied to steps 616-622 in determining what data to send back to the visitor, whether there is enough data for a statistically valid response, etc. Moreover, the rules applied can be dynamic depending on the size of the data set 304. For example, if the data set is large, a response by 50% of the slices may be sufficient, whereas if the data set is small, a higher percentage such as 80% of the slices must be present to send valid data back to the visitor.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for responding to requests for data from a client device, the system comprising: a front-end server configured to: receive a request for data from a client; identify a data set to be retrieved, wherein the identified data set comprises stored data that corresponds to the requested data; identify a plurality of slices of data to be retrieved, wherein each identified slice of data to be retrieved comprises a complete uncompromised segment of the identified data set that can be used to provide a statistically valid response to the request for data such that the front-end server is capable of generating a statistically valid response to the request upon receiving data corresponding to less than all of the plurality of slices of data identified; generate a plurality of sub-requests, wherein each of the plurality of sub-requests corresponds to an identified slice of data to be retrieved; communicate the plurality of sub-requests to one or more of a plurality of back-end servers; receive data corresponding to less than all of the plurality of slices of data identified; and generate, in response to receiving data corresponding to less than all of the plurality of slices of data identified, a statistically valid response to the request for data, wherein to generate the statistically valid response, the front-end server is further configured to scale the data received to account for data that is not received; wherein each respective back-end server is configured to: receive one or more of the plurality of sub-requests from the first front-end server; load, from a database, a portion of the stored data corresponding to the identified slice of data to be retrieved that corresponds to the one or more sub-requests received at the respective back-end server; and transmit, to the front-end server, data corresponding to the identified slice of data loaded from the database; and wherein the database comprises the stored data, wherein the database is configured to communicate, to each respective back-end server, a portion of the stored data corresponding to the identified slice of data to be retrieved that corresponds to the one or more sub-requests received at the respective back-end server.

2. The system of claim 1, wherein the system further comprises a second front-end server configured to: receive a request for data from a client; identify a data set to be retrieved, wherein the identified data set comprises stored data that corresponds to the requested data; identify a plurality of slices of data to be retrieved, wherein each identified slice of data to be retrieved is a complete uncompromised segment of the identified data set to be retrieved; generate a plurality of sub-requests, wherein each of the plurality of sub-requests corresponds to an identified slice of data to be retrieved; and communicate the plurality of sub-requests to one or more of the plurality of back-end servers.

3. The system of claim 1, wherein the back-end servers filter the data in response to a filter request and based on criterion provided by the front-end servers.

4. The system of claim 1, wherein the stored data comprises website visitation data stored in a binary format.

5. The system of claim 4, wherein a binary format used to send the data to the client is encoded according to a hash algorithm so as to minimize bandwidth usage, the binary format is identical to the format used in database so that no file format translation need be performed when back-end servers extract data from the database.

6. The system of claim 1, wherein the back-end servers store and process the portion of the stored data received from the database.

7. The system of claim 1, wherein sub-request are distributed to one or more of the plurality of the back-end servers according to the load and availability of each of the plurality of the back-end servers.

8. The system of claim 1, wherein to generate the statistically valid response, the front-end server is further configured to determine statistical validity for the response depending on a size of the data set request for data comprises scaling the data received to account for data that is not received.

9. The system of claim 1, wherein to communicate the plurality of sub-requests to one or more of a plurality of back-end servers, the front-end server is further configured to: communicate, to a first of the back-end servers, a first of the plurality of sub-requests corresponding to a first identified slice of data to be retrieved; and communicate, to a second of the back-end servers, a second of the plurality of sub-requests corresponding to a second identified slice of data to be retrieved, wherein to receive the data corresponding to less than all of the plurality of slices of data identified, the front-end server is further configured to: receive, from at least the first back-end server, a response comprising data corresponding to the first sub-request and the first identified slice of data to be retrieved; and fail to receive, from at least the second back-end server, a response comprising data corresponding to the second sub-request and the second identified slice of data to be retrieved, and wherein to generate the statistically valid response to, the front-end server is further configured to: scale the data of responses received to generate a statistically valid response based at least on the received response comprising data corresponding to the first sub-request and the first identified slice of data to be retrieved.

10. A method for accessing a web analytics system and responding to a query, the method comprising the steps of: assigning a visitor to one of a plurality of front-end servers; receiving a query for data from the visitor; identifying a data set to be retrieved, wherein the identified data set comprises stored data that corresponds to the queried data; identifying a plurality of slices of data to be retrieved, wherein each identified slice of data to be retrieved is a complete uncompromised segment of the identified data set that can be used to provide a statistically valid response to the query for data such that the front-end server is capable of generating a statistically valid response to the query upon receiving data corresponding to less than all of the plurality of slices of data identified; generating a plurality of sub-requests, wherein each of the plurality of sub-requests corresponds to an identified slice of data to be retrieved; communicating the plurality of sub-requests to one or more of a plurality of back-end servers; wherein each respective back-end server is configured to: receive one or more of the plurality of sub-requests from the first front-end server; retrieve, from a database, a portion of the stored data corresponding to the identified slice of data to be retrieved that corresponds to the one or more sub-requests received at the respective back-end server; and notify the front-end server that the portion of the stored data is loaded into the respective back-end server; receiving, from the plurality of back-end servers, data corresponding to less than all of the plurality of slices of data identified; generating, in response to receiving data corresponding to less than all of the plurality of slices of data identified, a statistically valid response to the request for data, wherein said generating the statistically valid response comprises scaling the data received to account for data that is not received; and sending the statistically valid response as the response to the query.

11. The method of claim 10, wherein the step of assigning the visitor to one of the plurality of front-end servers is performed to load balance a plurality of visitors among the plurality of front-end servers.

12. The method of claim 10, wherein assigning the visitor to one of the plurality of front-end servers comprises the steps of: receiving the query from the visitor; assigning the visitor a visitor identification number; and assigning the visitor to one of a plurality of front-end servers based on the visitor identification number assigned to the visitor.

13. The method of claim 12, wherein the step of assigning the visitor to one of a plurality of front-end servers assigns the visitor to a first front-end server if the visitor identification number is in a first group, and assigns the visitor to a second front-end server if the visitor identification number is from a second group.

14. A method for loading a data set from a database to a plurality of back-end servers, the method comprising the steps of: identifying a data set to be retrieved corresponding to a visitor; identifying a plurality of slices of data to be retrieved, wherein each identified slice of data to be retrieved is a complete uncompromised segment of the identified data set that can be used to provide a statistically valid response to a request for data such that a front-end server receiving data is capable of generating a statistically valid response to the request upon receiving data corresponding to less than all of the plurality of slices of data identified, and wherein a determination of statistical validity for the response depends on a size of the data set; generating a request for a selected slice of the plurality of slices of data to be retrieved; determining which of the plurality of back-end servers has the lowest load based on the load and availability for the plurality of back-end servers; selecting a back-end sever determined to have the lowest load; and sending the request to the selected back-end server.

15. The method of claim 14, wherein the step of sending the request to the selected back-end sever is performed by broadcasting a UDP broadcast message to available backend servers.

16. The method of claim 14, wherein determining which of the plurality of back-end servers has the lowest load based on the load and availability of the back-end server is a based on a factor from the group of: a number of slices already being processed, a processing power/speed of the back-end server, a communication/connection speed available to the back-end server, and other processing characteristics.

17. The method of claim 14 wherein the step of selecting the back-end server selects the back-end server with the best availability.

18. The method of claim 14 further comprises the steps of sending a confirmation message indicating the data slice has been loaded into the back end server.

19. The method of claim 14, further comprising:
transmitting a confirmation message from the selected back-end server, the confirmation message indicating a visitor identification, number for the slice and percentage of the data set that the slice represents.

20. The method of claim 14 wherein some of steps are performed by a frontend server and wherein the process for loading data slices is masterless and is done in an anarchistic way.

21. A method for responding to a query for data from a client, the method comprising the steps of: receiving at a front-end server a query from a visitor, the visitor corresponding to a data set; identifying a data set to be retrieved, wherein the identified data set comprises stored data that corresponds to the data set corresponding to the visitor; identifying a plurality of slices of data to be retrieved, wherein each identified slice of data to be retrieved is a complete uncompromised segment of the identified data set to be retrieved that can be used to provide a statistically valid response to the request for data such that the front-end server is capable of generating a statistically valid response to the request upon receiving data corresponding to less than all of the plurality of slices of data identified, and wherein a determination of statistical validity for the response depends on a size of the data set; generating by the front-end server a broadcast request for at least one of the plurality of slices of data to be retrieved, the broadcast request being sent to a plurality of back-end servers including at least a first back-end server, the broadcast request including a visitor identification number assigned to the visitor; where at least one of the back-end severs is configured to: receive the broadcast request; determine whether the back-end server holds at least one of the plurality of slices of data to be retrieved; perform, responsive to determining that the back-end server holds a slice of data to be retrieved, at least a portion of the query on the back-end server to generate result data including the data to be retrieved held by the back-end server; and send the result data in association with the visitor identification number to the front-end server.

22. The method of claim 21 wherein the broadcast request is sent to as many as possible of plurality of the back-end servers.

23. The method of claim 21 wherein the step of sending result data includes sending a percentage of the data set that the result data represents.

24. The method of claim 23 further comprising the steps of: determining that the entire data set has been received by the front-end server; upon determining that the entire data set has been received by the front end server: combining responses from the plurality of back-end servers; and sending the combined response to the client.

25. The method of claim 23 further comprising the steps of: determining that less than the entire data set has been received by the front-end server; upon determining that less than the entire data set has been received by the front end server: combining responses from the plurality of back-end servers; determining the percentage of the data set received, multiplying the data from the request by the inverse of the determined percentage; and sending the multiplied data to the client.

26. The method of claim 23 further comprising the steps of comparing the determined percentage of the data set received to a threshold, and sending a message indicating there is not enough data for a statistically valid response to the visitor if the determined percentage is less than the threshold.

* * * * *

UNITED STATES PATENT AND TRADEMARK OFFICE
CERTIFICATE OF CORRECTION

PATENT NO. : 8,239,535 B2
APPLICATION NO. : 11/313589
DATED : August 7, 2012
INVENTOR(S) : Christopher R. Error et al.

Page 1 of 1

It is certified that error appears in the above-identified patent and that said Letters Patent is hereby corrected as shown below:

In The Claims:

In claim 8, line 4, column 10, after "the data set" delete "request for data comprises scaling the data received to account for data that is not received".

Signed and Sealed this
Twenty-sixth Day of March, 2013

Teresa Stanek Rea
*Acting Director of the United States Patent and Trademark Office*